United States Patent [19]
Russell et al.

[11] 3,720,872
[45] March 13, 1973

[54] POWER TRANSMISSION FAULT INDICATOR WITH AUTOMATIC RESET MEANS

[75] Inventors: Taft Birch Russell, Edison; John Gracie, Piscataway, both of N.J.

[73] Assignee: Taft Electrosystems, Inc., Metuchen, N.J.

[22] Filed: Sept. 4, 1970

[21] Appl. No.: 69,563

[52] U.S. Cl..................324/133, 324/51, 340/253 A
[51] Int. Cl.........................G01r 19/16, G01r 31/02
[58] Field of Search........324/51, 132, 133, 131, 146; 317/31; 340/253

[56] References Cited

UNITED STATES PATENTS

| | | | |
|---|---|---|---|
| 3,263,170 | 7/1966 | Schneider | 324/132 X |
| 3,375,510 | 3/1968 | Pitches | 324/133 X |
| 3,480,863 | 11/1969 | Hopengarten | 324/133 |
| 3,524,133 | 8/1970 | Arnot | 317/31 X |
| 3,531,790 | 9/1970 | Staley | 324/133 UX |
| 1,130,633 | 2/1915 | Roller | 324/133 |
| 2,747,045 | 5/1956 | Parmer | 324/146 UX |
| 2,947,941 | 8/1960 | Corson et al. | 324/131 |

Primary Examiner—Gerard R. Strecker
Attorney—Norman N. Popper, John N. Bain, Daniel H. Bobis, John G. Gilfillan, III and R. Gale Rhodes, Jr.

[57] ABSTRACT

A fault indicator is provided which, in the event of normal power line operation, maintains itself in a status that reflects this normal condition. A surge or abnormal increase in the transmitted current reverses the direction of the current flow in at least a part of fault indicator circuit and causes the indicator to reflect the abnormal condition until the restoration of normal line conditions returns the current flow within the fault indicator circuit to its original direction to reestablish a normal condition indication.

3 Claims, 5 Drawing Figures

INVENTORS
TAFT BIRCH RUSSELL
JOHN GRACIE

ATTORNEY

POWER TRANSMISSION FAULT INDICATOR WITH AUTOMATIC RESET MEANS

This invention relates to apparatus for indicating abnormal power transmission line conditions, and the like.

Power transmission and distribution systems require substantial capital investment. These systems, moreover, are subject to many potentially harmful influences of which excess load and short circuit conditions are typical.

Provisions must be made not only to protect a particular system from damage caused by one or more of these influences, but also to aid in locating the source of difficulty in order to effect needed repair. For example, fault indication devices have been proposed to be located at critical places within the system to provide maximum information with respect to system difficulties. Usually, in response to a power or current surge in a part of a system, the indication device for that part of the system senses the fault and "trips" or changes state to provide a visual indication of the abnormal condition. Thus, the portion of the system that has been subject to a power or current surge, for example, by reason of a short circuit or the like can be determined through visual inspection of the indication devices.

After normal service is restored, however, each of the previously proposed fault indicators in the entire distribution network or at least a substantial part thereof must be checked and, where necessary, manually reset to reflect regular transmission conditions. Because electrical power systems often may extend over several hundred square miles, this requirement to inspect and manually reset each indicator that may have been affected by a current surge is very expensive in terms of manpower and human effort.

Accordingly, it is an object of this invention to provide a reliable and relatively inexpensive fault indicator device that automatically resets itself to a normal-indicating condition in response to the restoration of normal power transmission conditions.

Another object is to provide a device of the described character which is yieldably retained either in its fault or abnormal-indicating condition or in its normal-indicating condition so that the indicating condition will not be inadvertently changed.

Still another object is to provide a device of the described character which will reliably indicate the occurrence of an abnormal current flow in the monitored power transmission line, even when such abnormal current flow occurs for a short time period and is followed by an open circuit condition in the transmission line.

In accordance with an aspect of the invention, the need for a self-resetting fault indicator is satisfied through a monitoring device that responds to an abnormal increase in line current by reversing the direction of current flow in at least a portion of a circuit included in the device, and restores the original direction of current flow in such circuit when the line current returns to normal levels.

More specifically, a device according to the invention may be inductively coupled to a power transmission line, and includes an indicator mechanism yieldably retained in a position that reflects a normal line condition until a circuit of the device automatically applies a signal to the indicator mechanism in response to an abnormal current flow in the monitored line which will cause the indicator mechanism to change state and reflect or indicate the abnormal line condition.

In a particular embodiment, during normal line operation, a diode restricts current flow to a first direction through the latching mechanism. In the event of a power or current surge in the monitored line, however, a controlled rectifier conducts current in the opposite direction through the latching mechanism and causes the mechanism to indicate a fault or abnormal condition. On the restoration of normal line conditions, the controlled rectifier is turned off and thereby promotes current flow in the first direction through the diode. This change in the direction of current flow causes the latching mechanism to reset and indicate a normal line condition, thereby eliminating the need for personal inspection and manual resetting.

For a better understanding of the present invention, together with the principles thereof, reference may be had to the following description of illustrative embodiments which is to be read in connection with the accompanying drawings in which.

Figure 1:
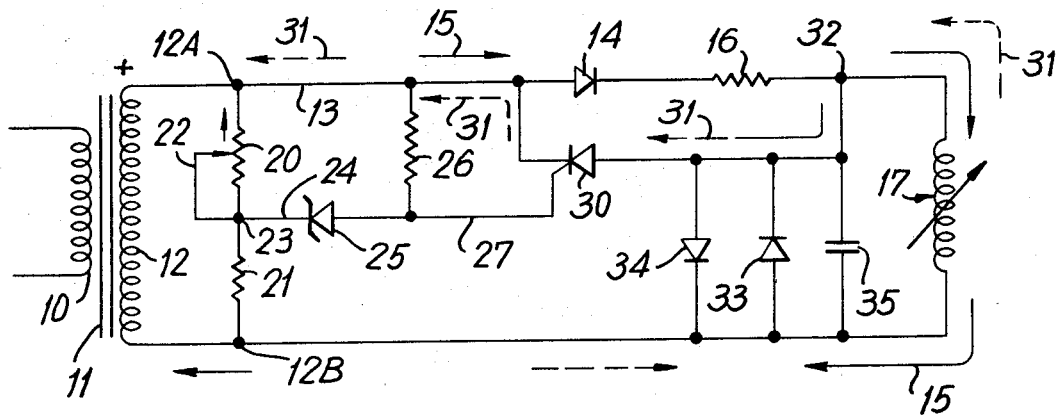
FIG. 1 is a schematic diagram of an illustrative embodiment of the invention.

For a more complete appreciation of the invention, attention is invited to FIG. 1 which shows a portion of an alternating current power transmission line 10, shown for the purpose of clarity as the primary winding of a transformer. The alternating magnetic field established by the current in the line 10 is coupled through a magnetically permeable core 11 to an inductive sensing coil or winding 12 that has terminals 12A and 12B. The coil 12 is shown merely for illustrative purposes as a secondary transformer winding.

The coil 12 is connected through the terminal 12A and a conductor 13 to the anode of a rectifier or positively poled diode 14. The diode 14 will be "forward biased" and conduct current only in the direction indicated by the solid arrow 15. The diode 14 moreover, will conduct this current only when a positive voltage is induced at the end of coil 12 that is connected through terminal 12A to the diode. When this applied voltage is reversed, the diode 14 will not conduct and is in a condition known as "back biased."

The cathode of diode 14 completes a path back to terminal 12B of the coil 12 through a path that includes a resistance 16 of relatively low value and an indicator mechanism generally identified by reference numeral 17. An exemplary indicator mechanism 17 will be described subsequently in more complete detail. This mechanism is shown in FIG. 1, moreover, as a variable inductance only for explanatory purposes.

A voltage divider comprising a variable resistor 20 and a fixed resistor 21 is connected between coil terminals 12A and 12B. The wiper 22 of variable resistor 20 is connected to a common junction 23 for the resistors 20 and 21. Thus, the wiper 22 selectively bypasses or shuts down a portion of the resistor 20. A conductor 25 couples the common junction 23 to the cathode of a voltage sensitive Zener diode 25. The Zener diode, which will conduct current when forward biased, will not conduct a current in the reverse direction until a back bias voltage exceeding a particular value is applied thereto by way of conductor 24. On reaching this conducting back bias condition, the reverse current flow increases by many orders of magnitude with little measurable change in the back bias voltage.

The anode of the Zener diode 25 is connected through a resistor 26 to the anode of the diode 14 and to the coil terminal 12A. The anode of the Zener diode 25 also is connected through a conductor 27 to a gate electrode of a controlled rectifier or SCR 30. The controlled rectifier 30 is poled to conduct current in the direction indicated by a phantom or broken-line arrow 31. It should be noted that this current direction is generally opposite to that which is indicated by the solid arrow 15 associated with the diode 14.

The controlled rectifier 30 is connected in parallel with the diode 14, the cathode of the rectifier being coupled to the anode of diode 14 and the coil terminal 12A. The controlled rectifier anode, moreover, is connected to a junction 32 between resistor 16 and indicator mechanism 17. A pair of parallel connected and oppositely poled voltage limiting diodes 33 and 34 also are coupled between the junction 32 and the sensing coil terminal 12B to protect the controlled rectifier 30 and mechanism 17 from exposure to high voltages. A charge storage capacitor 35 completes the parallel connection between junction 32 and coil terminal 12B.

In operation, line 10 carrying alternating current is magnetically coupled through core 11 to sense coil 12. This coupling induces an alternating current in coil 12 that periodically establishes a positive potential at terminal 12A. In this condition, the diode 14 conducts a current through mechanism 17 in the direction of solid arrow 15. With such current flow through mechanism 17 the latter indicates a normal line condition. During each of these positive voltage swings, a charge is stored in capacitor 35. When the voltage at the terminal 12A becomes negative, the diode 14 stops conducting and the capacitor 35 discharges through mechanism 17 thereby to smooth out the unidirectional pulses through mechanism 17.

In the event of a power or current surge in line 10, greater voltage amplitudes necessarily are established at the coil terminals 12A and 12B. When the surge current establishes a positive voltage at the coil terminal 12B, the resistor 26 holds the anode of the Zener diode 25 at a lower voltage than the cathode, thus back biasing the Zener diode. Depending on the amplitude of the voltage produced across the terminals 12A and 12B by the power or current surge, the resistance established by the wiper 22 and the breakdown characteristics of diode 25, the Zender diode will conduct current in a direction from the terminal 12B through the resistor 21, the reverse biased Zener diode 25 and the resistor 26 to the coil terminal 12A.

When the Zener diode 25 conducts in the reverse direction it establishes a gate current through conductor 27 to the gate electrode of controlled rectifier 30 whereby the latter is tripped to conduct current in the direction of broken-line or phantom arrow 31. Of course, during each half-cycle of the alternating voltage induced in coil 12 when the polarity at terminal 12A is positive, the controlled rectifier or SCR 30 is turned off, but the SCR 30 is again turned on during the following cycle when the polarity at terminal 12B is positive so long as the voltage thus applied to Zener diode 25 remains sufficiently large to exceed the breakdown voltage thereof.

When controlled rectifier 30 is in its conducting state, and in accordance with a characteristic of the invention, the current flows through indicator mechanism 17 in a direction that is opposite to the direction of current flow in a normal line condition. This change in current direction causes mechanism 17 to "set" in a status that indicates a faulted line.

To ensure that mechanism 17 will indicate a fault line condition when the excess positive voltage at the sensing coil terminal 12B occurs for only a single half-cycle and then is followed by an open line condition in power line 10, the capacitor 35 discharges through mechanism 17 in the direction shown by phantom arrow 31. The capacitor 35 thus maintains current flow through the controlled rectifier 30 for a sufficient period to ensure that indicator mechanism 17 will shift to a fault indication.

Because the relative electrical resistance for a current path through the controlled rectifier 30 is lower than the current path through the diode 14 and resistor 16, the current in the direction of phantom arrow 31 is greater than the current that flows in the direction of solid arrow 15. Accordingly, a single pulse power or current surge in the transmission line 10 that induces an excess positive potential at the terminal 12B, will sufficiently charge capacitor 35 to drive the latching indicator mechanism 17 into a fault status. Further, by reason of the relation of the current in the direction of the arrow 31 to the current in the direction of the arrow 15, when terminal 12A becomes positive, the resulting current in the direction of arrow 15 is bucked by an opposing current due to the discharge of capacitor 35 to avoid premature resetting of mechanism 17 to a normal line condition.

In accordance with another characteristic of the invention, when the transmission line 10 is restored to normal operation, indicator mechanism 17 automatically resets to indicate satisfactory line operation. Upon the restoration of normal line operation, as the voltage at the terminal 12B assumes a normal positive potential, the Zener diode 25 will not conduct a reverse current and thus will fail to provide a gating signal for the controlled rectifier 30. As the voltage at the terminal 12A and hence, as the cathode of controlled rectifier 30 becomes positive, the capacitor 35 discharges. Further, as the terminal 12A becomes positive and the terminal 12B goes negative, the controlled rectifier 30 is back biased and stops conducting current. Current flow is resumed through diode 14 in the manner described in connection with normal transmission line operation, that is, in the direction of solid arrow 15.

Typical electrical components and component values suitable for use in connection with a particular embodiment of the invention are as follows:

| Reference Numeral | Component or Component Value |
|---|---|
| 12 | Sense Coil, 350 turn winding |
| 14 | Diode 1 N 4004 |
| 16 | Resistor 150Ω |
| 20 | Variable Resistor 1.0 KΩ (maximum value) |
| 21 | Resistor 9.1 KΩ |
| 25 | Zener Diode 1 N 751A |
| 26 | Resistor 1.0 KΩ |
| 30 | Silicon Controlled Rectifier C 106B |
| 33 and 34 | Diode 1 N 4001 |
| 35 | Capacitor 600 μf at 3 V D.C. |

Figure 2:
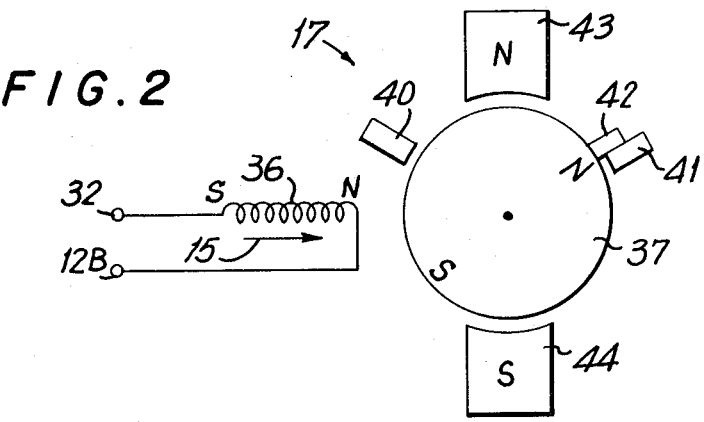
FIG. 2 is a schematic view of a typical latching indicator mechanism suitable for use in connection with the embodiment of the invention shown in FIG. 1, and shown in its normal indication position.

One indicator mechanism 17 that has been found especially suitable for use in connection with the invention is shown in FIG. 2. In such mechanism, an electromagnet or solenoid 36 is connected, at its ends, to coil terminal 12B (FIG. 1) and the junction 32. Depending on the resulting direction of current flow through the winding of solenoid 36, a north or a south polarity is established on one end thereof. Within the magnetic field established by current flow through solenoid 36, a centrally pivoted permanent magnet 37 has its poles attracted or repelled, depending on the relative polarities of the solenoid and the pivoted magnet. Stops 40 and 41 are provided to engage a protruding member 42 on the pivoted magnet 37 to limit the pivotal movements of the latter to an angular range of less than 180°. A permanent north pole 43 and a permanent south pole 44 which may be end parts of a common magnet are arranged on diametrically opposite sides of the pivoted magnet 37 in a plane that is generally perpendicular to the direction of the fields established by the solenoid 36. The poles 43 and 44 coact with the poles of magnet 37 to yieldably retain or urge the latter in each of its limited positions shown on FIGS. 2 and 3. The field strengths of the poles 43 and 44 are substantially less than the field strength of the solenoid or electromagnet 36.

In operation, and as shown on FIG. 2, the current flow in the direction of arrow 15 causes the north pole established on solenoid 36 to repel the north pole of pivoted magnet 37 and to attract the south pole of the latter and thereby drives the magnet 37 to the position where member 42 abuts against the stop 41. Mutual coaction of the magnetic fields established by the poles 43 and 44 and by magnet 37 tends to retain the pivoted magnet 37 in such position.

Figure 3:
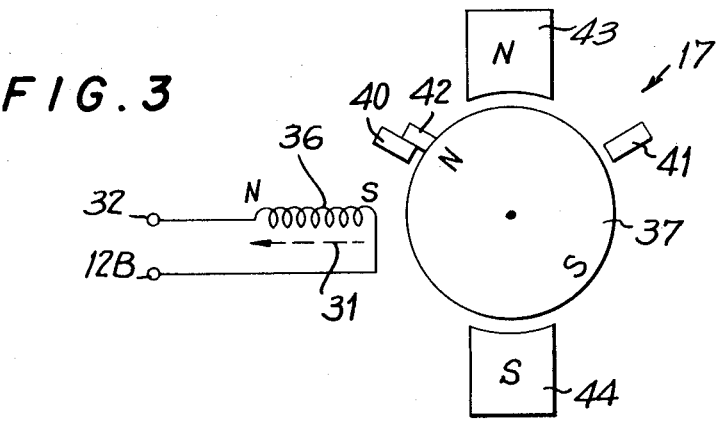
FIG. 3 is a view similar to that of FIG. 2, but showing the mechanism in its fault indication position.

Current flow through solenoid 36 in the opposite direction, that is, in the direction of arrow 31 on FIG. 3, reverses the polarity of the magnetic field of solenoid 36 which overcomes the fields established by poles 43 and 44 and causes angular displacement of magnet 37 to the position shown on FIG. 3 where protruding member 42 engages the stop 40. The mutual effect of the poles 43 and 44 again retains the pivoted magnet in the position shown on FIG. 3 until the current flow within the solenoid 36 is once more restored to the direction of arrow 15 on FIG. 2. The pivoted magnet, moreover, can bear normal and abnormal or fault indicia which are respectively visible in the positions of the magnet 37 shown on FIGS. 2 and 3, or magnet 37 can be made to activate switches or execute any further normal and abnormal signal indications, as required.

Figure 4:
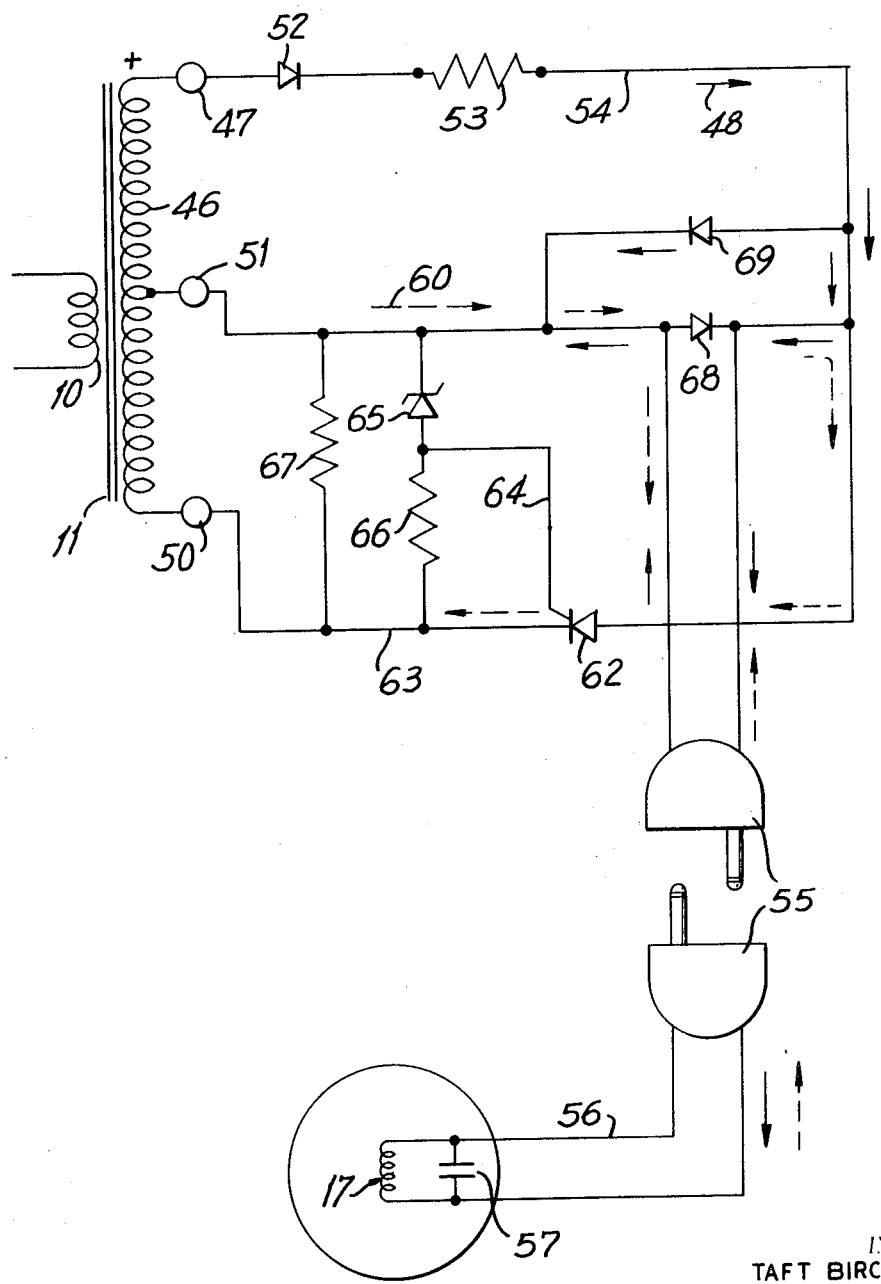
FIG. 4 is a schematic diagram of another illustrative embodiment of the invention.

Another embodiment of the invention is shown in FIG. 4, in which the alternating magnetic field established by the power transmission line 10 is coupled through a magnetically permeable core 11 to an inductive sensing coil 46. The coil 46 has end terminals 47 and 50 and a center tap 51. The anode of rectifying diode 52 is connected to the coil terminal 47 and the cathode of this diode establishes a path for current flow in the direction of solid arrow 48 through indicator mechanism 17. This path includes a fixed resistor 53, a conductor 54, a connector 55, the indicator mechanism 17, a conductor 56 and the center tap 51 on coil 46.

During normal transmission line operation, a positive potential induced at the terminal 47 establishes current flow through the aforementioned path. When the voltage at terminal 47 becomes negative, reverse current flow is blocked by diode 52 and a capacitor 57 that is connected in parallel with indicator mechanism 17 discharges and thus smooths out the pulsating unidirectional current flow that results.

During abnormal transmission line conditions, for example, a surge caused by an excess load or short circuit, current flow is established in the circuit in the direction indicated by phantom or broken-line arrows 60. In this instance, the current flows from the center tap 51 through the conductor 56 to the indicator mechanism 17. The mechanism 17 sets to indicate abnormal or fault line conditions. From the mechanism 17, the current then flows through the connector 55, a conductor 61 to the anode of a controlled rectifier or SCR 62, and from the cathode of SCR 62, through a conductor 63 to the negative voltage established at the sense coil terminal 50.

In accordance with a characteristic feature of the invention, the controlled rectifier 62 is switched on and forward biased to conduct current, as above, in response to a gating current that flows through a gate electrode 64 when a Zener diode 64 undergoes reverse bias breakdown. The cathode of the Zener diode 65 is connected to the center tap 51 and the anode of this diode 65 is connected through resistor 66 to the sense coil terminal 50. Accordingly, when the potential at the terminal 50 becomes sufficiently negative relative to the center tap 51, the Zener diode 65 breaks down and conducts a reverse current through a path that includes the anode resistor 66. The resistor 66, in combination with a parallel connected resistor 67, fix the voltage level and hence the magnitude of the current surge that will drive the Zener diode 65 and the controlled rectifier 62 into conduction. The controlled rectifier 62, which is forward biased thus is gated into conduction to shut down the diode 52 and establish a current in the direction of the phantom arrows 60.

As the potential at the terminal 50 becomes positive, the capacitor 57 discharges through indicator 17 and the controlled rectifier 62, which continues to conduct until its anode voltage is greater than its cathode voltage at a time when no gating current is supplied to its gate electrode 64. This capacitor action smooths out pulsating unidirectional current supplied to indicator mechanism 17.

When normal line operation is restored, however, the voltage drop between the center tap 51 and the terminal 50 is insufficient to keep the Zener diode 65 in a conducting state and provide further gating currents. As the potential at the terminal 50 becomes positive relative to the center tap 51, the controlled rectifier 62 is back biased or turned off, thereby stopping current flow through the indicator mechanism in the direction indicated by the phantom arrows 60.

After the controlled rectifier 62 has turned off, and as the potential at the terminal 47 becomes positive, the diode 52 begins to conduct and reestablish current flow through the indicator mechanism 17 in the opposite direction indicated by the solid arrow 48. The restoration of oppositely directed current flow causes the mechanism to reset and indicate normal line conditions.

Thus, in accordance with the principles of the invention, the circuit shown in FIG. 3 automatically resets itself on the return of ordinary transmission line operation.

It is to be noted that the voltage drop across resistor 53 is sufficiently large so that, when SCR 62 is in its conducting state, as described above, the current flow is predominantly from tap 51 to terminal 50. Further, by reason of such resistor 53, the current flow through mechanism 17 in the direction of arrows 60 is substantially greater than the current flow in the direction of arrows 48. Thus, as in the first described embodiment, the relatively large current in the direction of arrows 60 which results from an abnormal high current in line 10 cooperates with capacitor 57 to ensure the provision of a fault indication by mechanism 17 even if such abnormal current persists for only a single cycle and is followed by an open line condition.

In the circuit shown on FIG. 4, the oppositely poled diodes 68 and 69 correspond to the diodes 33 and 34 on FIG. 1 and perform similar voltage limiting functions.

Figure 5:
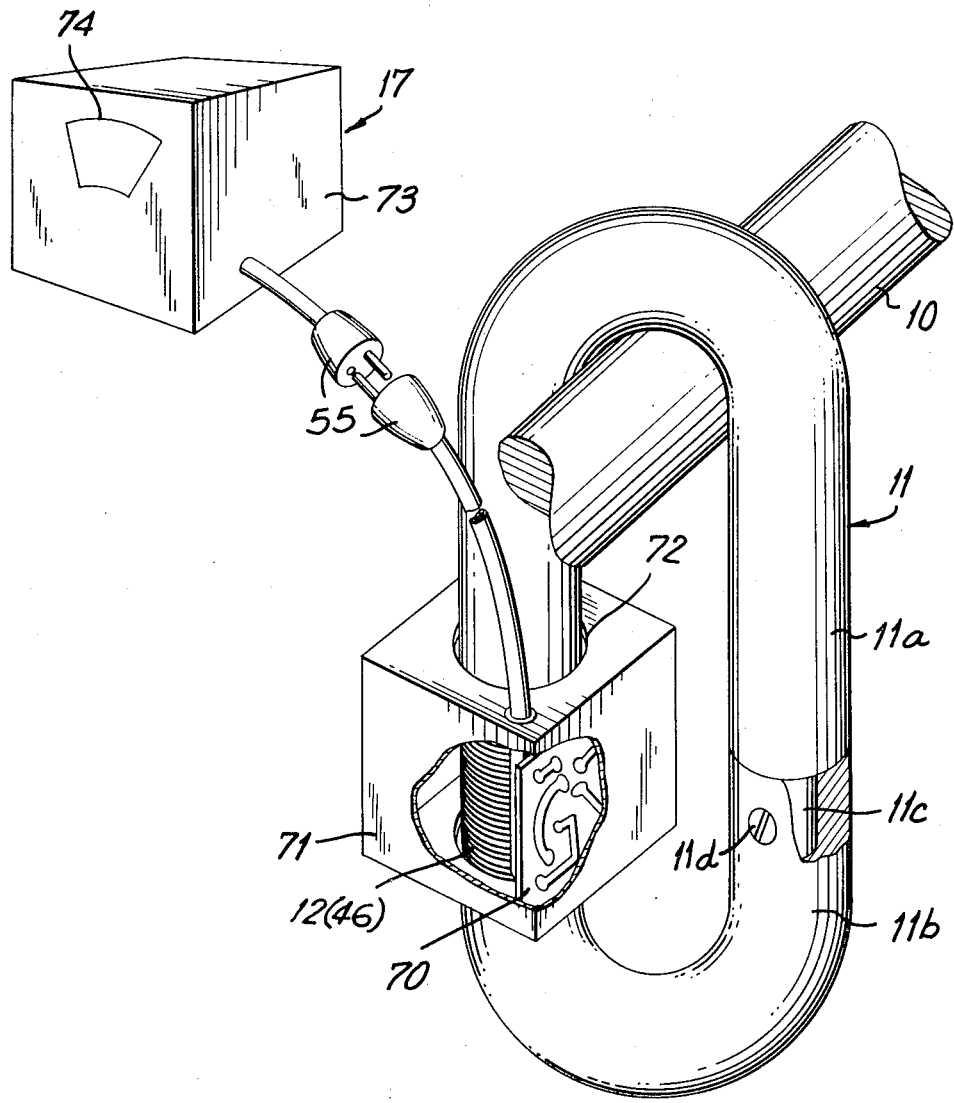
FIG. 5 is a perspective view of a fault indicator device according to this invention which is shown partly broken away and in association with a transmission line to be monitored by the device.

Referring now to FIG. 5, it will be seen that, in either of the above described embodiments of the invention, the circuit of FIG. 1 or of FIG. 4 may be in the form of a printed circuit board 70 housed in a casing 71 and suitably connected with the sense coil 12 or 46 which is wound about a cylindrical wall provided in casing 71 to define a bore 72 extending therethrough. The core 11 for inductively coupling the coil 12 or 46 with the power transmission line 10 may be in the form of a pair of C-shaped magnetically permeable members 11a and 11b which are suitably joined together so as to extend through bore 72 after being draped or engaged over line 10. As shown, members 11a and 11b of core 11 may be joined together by a stud 11c extending from an end of member 11a and retained in a socket of member 11b, as by a set screw 11d.

The portion of the circuit housed in casing 71 is connected, as by the separable connector 55, with the indicator mechanism 17 which may be remotely located. Such indicator mechanism 17 may have its described components in a housing 73 provided with a window 74 at which the normal operating indication and the fault indication are alternatively exposed in accordance with the position of magnet 37.

Although illustrative embodiments of the invention have been described in detail herein, it is to be understood that the invention is not limited to those precise embodiments, and that various changes and modifications may be effected therein by one skilled in the art without departing from the scope or spirit of the invention.

What is claimed is:

1. Apparatus for indicating the occurrence of current flow through a conductor below a predetermined level, and also for indicating occurrence of current flow through a conductor above said predetermined level, comprising:

means including a magnet displaceable between a first indicating position and a second indicating position, said first indicating position for indicating said current flow below said predetermined level and said second indicating position for indicating said current flow above said predetermined level;

coil means for establishing a first magnetic field for acting on said magnet and for displacing said magnet to said first indicating position in response to current flow through said coil means in one direction, and for establishing a second magnetic field for acting on said magnet and for displacing said magnet to said second indicating position in response to greater current flow through said coil means in the opposite direction;

winding means adapted to be coupled to said conductor and for having a voltage induced therein which is proportional to the current flow in said conductor;

means, including serially interconnected diode and resistance means, connected to said coil means and said winding means and for providing a current flow path through said coil means for said current flow through said coil means in said one direction;

means, including a voltage sensitive switch having conducting and non-conducting states, connected to said winding means and said coil means, and upon said voltage sensitive switch being in said conducting state for providing a current path, including said voltage sensitive switch, for said greater current through said coil means in said opposite direction; and voltage responsive control means connected to said winding means and said voltage sensitive switch and for placing said voltage sensitive switch in said conducting state upon said current flow in said conductor going from below to above said predetermined level.

2. Apparatus according to claim 1 wherein said voltage sensitive switch is a silicon controlled rectifier.

3. Apparatus for indicating occurrence of current flow through a conductor below a predetermined level, and also for indicating occurrence of current flow through a conductor above said predetermined level, comprising:

means including a magnet displaceable between a first indicating position and a second indicating position, said first indicating position for indicating said current flow below said predetermined level and said second indicating position for indicating said current flow above said predetermined level;

coil means for establishing a first magnetic field for acting on said magnet and for displacing said magnet to said first indicating position in response to current flow through said coil means in one direction, and for establishing a second magnetic field for acting on said magnet and for displacing said magnet to said second indicating position in response to greater current flow through said coil means in the opposite direction;

winding means adapted to be coupled to said conductor and for having a voltage induced therein which is proportional to current flow through said conductor;

means, including serially interconnected diode and resistance means, connected to said coil means and said winding means and for providing a continuously established current path for said current flow through said coil means in said one direction;

means, including a silicon controlled rectifier connected to said winding means and said coil means, and for providing an intermittently established current path for said greater current through said coil means in said opposite direction, said silicon controlled rectifier having conducting and non-conducting states, and upon said silicon controlled rectifier being in said conducting state, said intermittently established current path being established;

voltage responsive control means connected to said winding means and said silicon controlled rectifier and for placing said silicon controlled rectifier in said conducting state;

upon a predetermined voltage being induced in said winding in response to current flow in said conductor going from below to above said predetermined level, said voltage responsive control means for placing said silicon controlled rectifier in said conducting state thereby establishing said intermittently established current path whereupon said greater current flows through said coil means in said opposite direction and overcomes said current flow through said coil means in said one direction to establish said magnetic field for displacing said magnet from said first indicating position to said second indicating position;

upon the current flow in said conductor dropping from above to below said predetermined level, said silicon controlled rectifier returning to said non-conducting state to interrupt said intermittently established current path for said greater current through said coil means in said opposite direction;

upon said silicon controlled rectifier being returned to said non-conducting state and upon said interruption of said intermittently established current path, said current flowing in said one direction through said continuously established current path through said coil means displacing said movable magnet from said second indicating position to said first indicating position thereby resetting said apparatus.

* * * * *